June 14, 1932.  C. W. KELLY  1,863,485
OPERATOR FOR WINDOWS
Filed Jan. 7, 1929
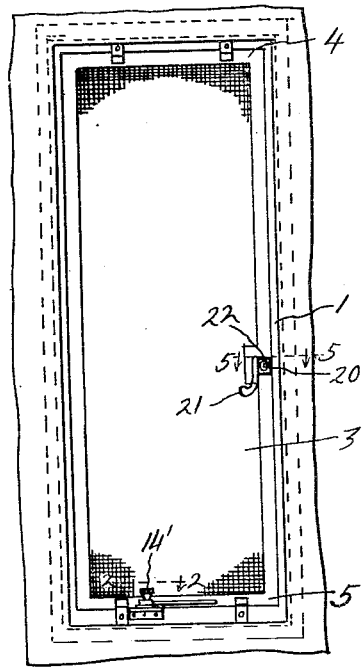
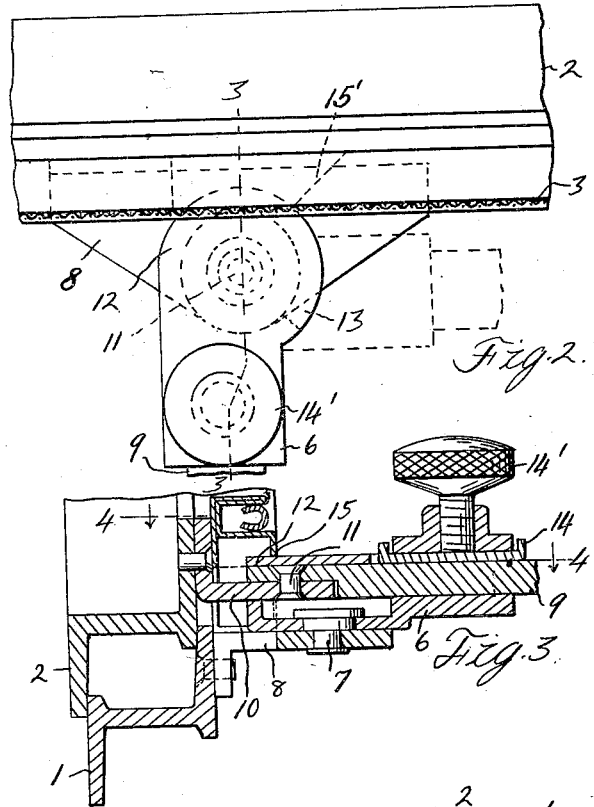
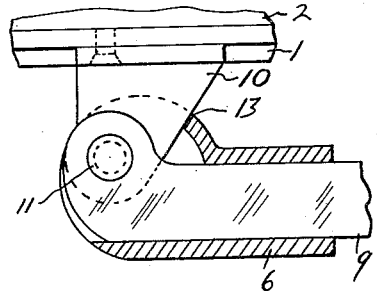
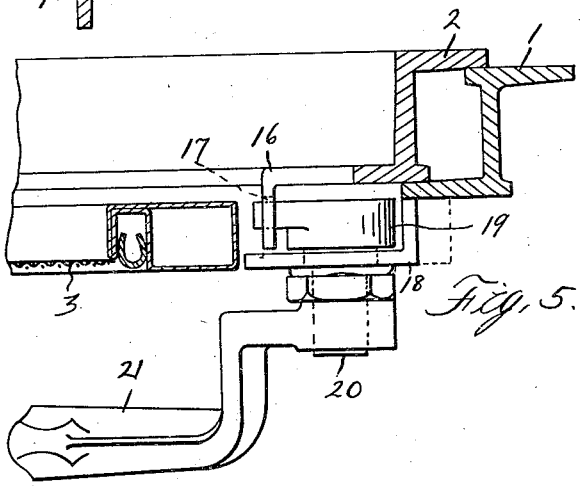
INVENTOR
Clyde W. Kelly
BY
ATTORNEYS Patented June 14, 1932

1,863,485

UNITED STATES PATENT OFFICE

CLYDE W. KELLY, OF DETROIT, MICHIGAN, ASSIGNOR TO DETROIT STEEL PRODUCTS COMPANY, OF DETROIT, MICHIGAN, A CORPORATION OF MICHIGAN

OPERATOR FOR WINDOWS

Application filed January 7, 1929. Serial No. 330,817.

The invention relates to operators for windows and refers more particularly to operators for screened windows in which the screens are at the inner sides of the window frames. One of the objects of the invention is to so construct the operator for the ventilator of the window that it may be easily actuated to open or close the ventilator. Another object is to so construct the operator that a part thereof closes the opening in the screen through which is adapted to extend the part of the operator connected to the ventilator. A further object is to provide a simple arrangement for locking the ventilator in closed position in the frame. With these as well as other objects in view, the invention resides in the novel features of construction and combinations and arrangements of parts as more fully hereinafter set forth.

In the drawing:—

Figure 1 is an interior side elevation of a window embodying my invention;

Figure 2 is an enlarged cross section on the line 2—2 of Figure 1;

Figure 3 is a cross section on the line 3—3 of Figure 2;

Figure 4 is a cross section on the line 4—4 of Figure 3;

Figure 5 is an enlarged cross section on the line 5—5 of Figure 1.

In the present instance I have shown the operator as applied to a casement window having the frame 1 and the ventilator 2 for closing the opening in the frame, this ventilator being pivotally mounted upon a side bar of the frame and arranged to swing outwardly. 3 is the screen for the opening located at the inner side of the frame and suitably secured in place as by means of clips engaging the top and bottom bars 4 and 5, respectively, of its frame.

For swinging the ventilator, I have provided an operator comprising the support 6 which is pivotally mounted at 7 upon the bracket 8 secured to the inner side of the bottom bar of the frame 1. This operator also includes the rod 9, which extends through the support 6 and is guided by and movable longitudinally relative to the support. This rod has a curved end which is notched to receive the bracket 10 secured to the inner side of the bottom bar of the ventilator so that the lower face of this bracket is substantially flush with the lower face of the main portion of the rod. 11 is a pin pivotally connecting the bracket to the curved end of the rod. The support 6 has the head 12 which is provided with a curved periphery concentric with the pivot 7 and slotted at 13 to provide for angular adjustment of the support about the pivot without interfering with the rod. 14 is a clamp actuated by the screw 14' for securing the rod 9 in its adjusted positions.

The bottom bar 5 of the screen frame is formed with the opening 15, which preferably diverges outwardly and toward the hinge edge of the ventilator at 15'. The head 12 of the support 6 extends into this opening and closes the same and the rod 9 is adapted to extend through this opening to swing the ventilator.

For locking the ventilator in closed position I have provided the bracket 16, which is preferably L-shaped and has one leg rigidly secured as by being welded to the inner side of the swinging side bar of the ventilator and the other leg extending transversely inwardly and formed with the opening 17 elongated in a direction parallel to the plane of the ventilator. I have also provided the bracket 18 which is L-shaped and has one leg rigidly secured as by being welded to the inner side of the adjacent side bar of the frame 1 and the other leg extending substantially parallel to the plane of this frame. 19 is a rotatable cam fixedly secured to the shaft 20, which latter extends inwardly and is journaled in the last mentioned leg of the bracket 18. This cam has a wedging engagement with the inner wall of the opening 17 to tightly clamp the ventilator in closed position and this cam is adapted to be rotated by means of the handle 21 fixedly secured upon the shaft 20. This locking arrangement is of simple construction and permits its use with ventilators hinged at either edge.

To provide for readily removing the screen, the side bar of its frame is notched at 22 to extend around the bracket 18 in close proximity thereto so that after removal of the handle 21 the screen may be moved inwardly without interference by the rest of the locking means.

With this construction it will be seen that the support 6 and the rod 9, being pivotally mounted, provide for great leverage upon the ventilator by the operator during the initial opening or final closing movements owing to the fact that the support and rod are swung about their pivots either from or to a position substantially parallel to the ventilator; that the motion of the operator rod during the opening or closing movements of the ventilator is substantially continuous; and that a part of the operator closes the opening in the screen through which extends an operator part for operating the ventilator. It will also be seen that I have provided means for locking the ventilator in closed position in the frame, which may be interchangeably used with ventilators swinging at either edge.

What I claim as my invention is:

1. The combination with a window frame having an opening and having a bottom bar, a movable ventilator for the opening and a screen for the opening located at the inner side of said frame and provided with an opening, of an operator for said ventilator including a support pivotally mounted upon the bottom bar of said frame and closing the screen opening, and a rod movably mounted upon said support and adapted to extend through the screen opening for actuating said ventilator.

2. The combination with a window frame having an opening and having a side bar, a movable ventilator for the opening and a screen for the opening at the inner side of said frame and provided with an opening, of a rod adapted to extend through the screen opening for actuating said ventilator, and a guide for said rod pivotally mounted upon the side bar of said frame and closing the screen opening.

3. The combination with a window frame having side bars defining an opening, a ventilator for the opening pivotally mounted upon said frame and a screen for the opening at the inner side of said frame and provided with an opening, of a support pivotally mounted upon one of the bars of said frame and having a peripheral face concentric with the pivot for closing the screen opening, and a rod guided by and longitudinally movable relative to said support and adapted to extend through the screen opening for actuating said ventilator.

4. The combination with a window frame having side bars defining an opening, a movable ventilator for the opening and a screen for the opening at the inner side of said frame and provided with an opening, of a support pivotally connected to one of the side bars of said frame and closing the screen opening at all times, and an operator mounted upon said support and longitudinally movable relative thereto and adapted to extend through the screen opening for actuating said ventilator.

5. The combination with a window frame having side bars defining an opening, a movable ventilator for the opening and a screen for the opening at the inner side of said frame and provided with an opening, of a combined swinging and sliding operator extending through said screen opening for actuating said ventilator, and a guide for said rod pivotally mounted upon one of the side bars of said frame and closing the screen opening at all times.

6. The combination with a window frame having side bars defining an opening, a ventilator for the opening pivotally mounted upon said frame and a screen for the opening at the inner side of said frame and provided with an opening, of a bracket secured to the ventilator and having a portion projecting inwardly through the opening in the screen, a support in the form of a housing pivotally mounted upon the side bars of the window frame adjacent the opening in the screen and having a peripheral face concentric with the pivot for closing the screen opening, said peripheral face having an elongated slot therein for receiving the inner end of the bracket aforesaid and permitting swinging movement of the support relative to the bracket, and a rod having one end pivotally connected to the inner end of said bracket and slidably engaging said support whereby swinging said rod about its pivotal connection to the bracket causes a corresponding swinging movement of the support about the pivotal connection between the same and bar aforesaid of the frame.

7. The combination with a window frame having an opening, a movable ventilator for the opening and a screen at the inner side of said frame and provided with an opening, of a support pivotally mounted upon said frame and having a peripheral face substantially concentric with the pivot for closing the screen opening, and means comprising a rod for actuating said ventilator, said rod being movable relative to and guided by said support and adapted to extend through the screen opening, said support being pivotally mounted inside said screen at a sufficient distance therefrom to provide for positioning said rod in substantially parallel relation with said screen.

In testimony whereof I affix my signature.

CLYDE W. KELLY.